US009342359B2

(12) United States Patent
Kaltstein (10) Patent No.: US 9,342,359 B2
(45) Date of Patent: May 17, 2016

(54) INFORMATION PROCESSING SYSTEM AND INFORMATION PROCESSING METHOD (71) Applicant: Oliver Kaltstein, Gaertringen (DE)

(72) Inventor: Oliver Kaltstein, Gaertringen (DE)

( * ) Notice: Subject to any disclaimer, the term of this patent is extended or adjusted under 35 U.S.C. 154(b) by 94 days.

(21) Appl. No.: 14/268,446

(22) Filed: May 2, 2014

(65) Prior Publication Data

US 2015/0082083 A1 Mar. 19, 2015

(30) Foreign Application Priority Data

Sep. 18, 2013 (JP) .................................. 2013-192635

(51) Int. Cl.
G06F 11/00 (2006.01)
G06F 9/50 (2006.01)
G06F 11/20 (2006.01)

(52) U.S. Cl.
CPC .............. *G06F 9/50* (2013.01); *G06F 11/2025* (2013.01); *G06F 11/2035* (2013.01); *G06F 11/2043* (2013.01)

(58) Field of Classification Search
CPC ... G06F 11/2025; G06F 11/2043; G06F 9/50; G06F 9/5005; G06F 9/5027; G06F 5/5044; G06F 11/2035; G06F 5/5027; G06F 9/5044
See application file for complete search history.

(56) References Cited

U.S. PATENT DOCUMENTS

| 5,680,623 | A | 10/1997 | Onuma |
| 2009/0204694 | A1* | 8/2009 | Kaneko ......................... 709/223 |
| 2009/0292829 | A1* | 11/2009 | Mizuho .......................... 710/11 |
| 2014/0007131 | A1* | 1/2014 | Yamauchi et al. ............ 718/104 |

FOREIGN PATENT DOCUMENTS

| JP | S58-129548 | 8/1983 |
| JP | S59-024351 | 2/1984 |
| JP | S62-031445 | 2/1987 |
| JP | S62-059816 | 12/1987 |
| JP | H01-037779 | 8/1989 |
| JP | H08-328866 | 12/1996 |
| JP | 2956849 B2 | 10/1999 |
| JP | 2009-301479 | 12/2009 |

OTHER PUBLICATIONS

Japanese Office Action dated Nov. 5, 2013, which issued during prosecution of Japanese Application No. 2013-192635, which corresponds to the present application.

* cited by examiner

*Primary Examiner* — Philip Guyton
(74) *Attorney, Agent, or Firm* — Troutman Sanders LLP (57) ABSTRACT An information processing system includes two or more processors each of which can execute one or more instructions, an executability information storage unit in which executability information, which includes information specifying instructions as being executable or not executable by each of the two or more processors, can be stored for each of the two or more processors, and a control unit that, at the time of execution of a program, selects at least one processor for execution of one or more instructions necessary to execute the program, from among the two or more processors, with reference to the executability information, and causes the selected at least one processor to execute the instructions.

11 Claims, 6 Drawing Sheets

INFORMATION PROCESSING SYSTEM AND INFORMATION PROCESSING METHOD

CROSS-REFERENCE TO RELATED APPLICATION

This application claims priority under 35 U.S.C. §119 to Japanese Patent Application No. 2013-192635, filed on Sep. 18, 2013, the entire content of which being hereby incorporated herein by reference.

BACKGROUND OF THE INVENTION

1. Field of the Invention

The present invention relates to an information processing system and the like having processor-fault tolerance.

2. Description of Related Art

Conventionally, there has been a data processing system, including multiple processing apparatuses (which may be referred to as "processors"), a system controller, and a service processor having a function of collecting log information if a failure happens. Each of the multiple processing apparatuses forming the data processing system includes a unit that determines, if a failure happens, whether this failure affects all other apparatuses or affects only the apparatus where the failure has happened. Furthermore, the system controller includes a unit that, if it is determined that the failure affects only the apparatus where the failure has happened, stops the operation of only that apparatus. Moreover, the service processor collects log information of only the stopped apparatus where the failure has happened, without stopping the operations of apparatuses irrelevant to the failure (see, for example, Japanese Patent No. 2956849).

SUMMARY OF THE INVENTION

However, this conventional technique is configured such that, if a processor has suffered a partial failure, the entire processor is stopped. That is to say, it is not possible to effectively execute programs by partially using the processor.

A first aspect of the present invention is directed to an information processing system, including: a program storage unit in which a program that is to be executed can be stored; at least two processors each of which can execute at least one instruction; an executability information storage unit in which executability information, which includes information specifying each instruction as being executable or not executable by each of the at least two processors, can be stored for each of the at least two processors; and a control unit that, at the time of execution of the program, selects at least one processor for execution of at least one instruction necessary to execute the program, from among the at least two processors, with reference to the executability information stored in the executability information storage unit, and causes the selected at least one processor to execute the instruction.

With this configuration, it is possible to continue execution of programs even if all processors have suffered a partial failure.

Furthermore, a second aspect of the present invention is directed to the information processing system according to the first aspect, further including a diagnosis unit that checks whether or not each instruction is executable by each of the at least two processors, thereby acquiring executability information for each of the processors, and stores the executability information in the executability information storage unit.

With this configuration, it is possible to automatically acquire the processor failure status.

Furthermore, a third aspect of the present invention is directed to the information processing system according to the first or the second aspect, wherein the at least two processors respectively include registers in which results of instructions executed by the processors are held, and the execution results stored in the at least two registers of the at least two processors are shared between the at least two processors.

With this configuration, it is possible to properly continue execution of programs even if the processors have suffered a partial failure.

Furthermore, a fourth aspect of the present invention is directed to the information processing system according to any one of the first to the third aspects, further including: a delay-map storage unit in which instruction length information, which is information regarding an instruction length corresponding to each of the at least one instruction, can be stored; and a delay-counter unit that acquires instruction length information corresponding to the instruction that the control unit causes the processor to execute, and waits for a duration corresponding to the instruction length information.

With this configuration, it is possible to properly continue execution of programs even if the processors have suffered a partial failure.

Furthermore, a fifth aspect of the present invention is directed to the information processing system according to the fourth aspect, wherein the delay-map storage unit and the delay-counter unit are arranged in association with each of the at least two processors, and the delay-counter unit acquires instruction length information corresponding to the instruction that the control unit causes the processor to execute, from the delay-map storage unit corresponding to the processor that the control unit causes to execute the instruction, and waits for a duration corresponding to the instruction length information.

With this configuration, it is possible to properly continue execution of programs even if the processors have suffered a partial failure.

Furthermore, a sixth aspect of the present invention is directed to the information processing system according to any one of the first to the fifth aspects, wherein the executability information includes information indicating, for each instruction-group containing at least one instruction, whether or not the instructions contained in the instruction-group are executable.

With this configuration, it is possible to easily manage information indicating whether or not instructions are executable.

Furthermore, a seventh aspect of the present invention is directed to the information processing system according to any one of the first to the sixth aspects, wherein the executability information storage unit includes at least two executability information memory units, each of which is a storage medium in which executability information corresponding to one processor is stored.

With this configuration, it is possible to properly continue execution of programs even if the processors have suffered a partial failure.

Furthermore, an eighth aspect of the present invention is directed to the information processing system according to any one of the first to the sixth aspects, wherein the executability information storage unit is one storage medium in which at least two pieces of executability information respectively corresponding to the at least two processors are stored.

With this configuration, it is possible to properly continue execution of programs even if the processors have suffered a partial failure.

Furthermore, a ninth aspect of the present invention is directed to the information processing system according to any one of the first to the eighth aspects, further including an executability information output unit that outputs the at least one piece of executability information stored in the executability information storage unit.

Furthermore, a tenth aspect of the present invention is directed to the information processing system according to any one of the first to the ninth aspects, wherein, in order to select a processor for execution of one instruction, the control unit refers to the executability information corresponding to a processor that has executed an instruction immediately before said one instruction, selects the processor as the processor for execution of said one instruction in a case where the processor can execute said one instruction, and causes the selected processor to execute the instruction.

With this configuration, it is possible to perform processing at high speed.

With the information processing system according to the present invention, it is possible to continue execution of programs effectively using the processors even if the processors have suffered a partial failure.

DETAILED DESCRIPTION OF THE INVENTION

Hereinafter, an embodiment of an information processing system and the like will be described with reference to the drawings. Note that constituent elements denoted by the same reference numerals in the embodiment perform similar operations, and, thus, a description thereof may not be repeated.

Embodiment

In this embodiment, a description will be given regarding an information processing system, including two or more processors each of which can execute one, two, or more instructions, and a storage medium in which executability information indicating whether or not instructions are executable by each of the processors is held, wherein the information processing system executes a program using a processor having an executable instruction. Note that, in this embodiment, the storage media in which the executability information is held may be respectively provided for the processors, or one storage medium may be provided for the multiple processors. Note that the multiple processors may include a processor that can execute no instruction.

Furthermore, in this embodiment, the information processing system may include a diagnosis unit that diagnoses whether or not instructions are executable by each of the processors.

Furthermore, in the information processing system of this embodiment, execution results in registers are typically shared between the multiple processors.

Furthermore, the information processing system of this embodiment typically has a delay-map storage unit and a delay-counter unit, which will be described later.

Moreover, in this embodiment, the information processing system that outputs the executability information will be described.

Figure 1:
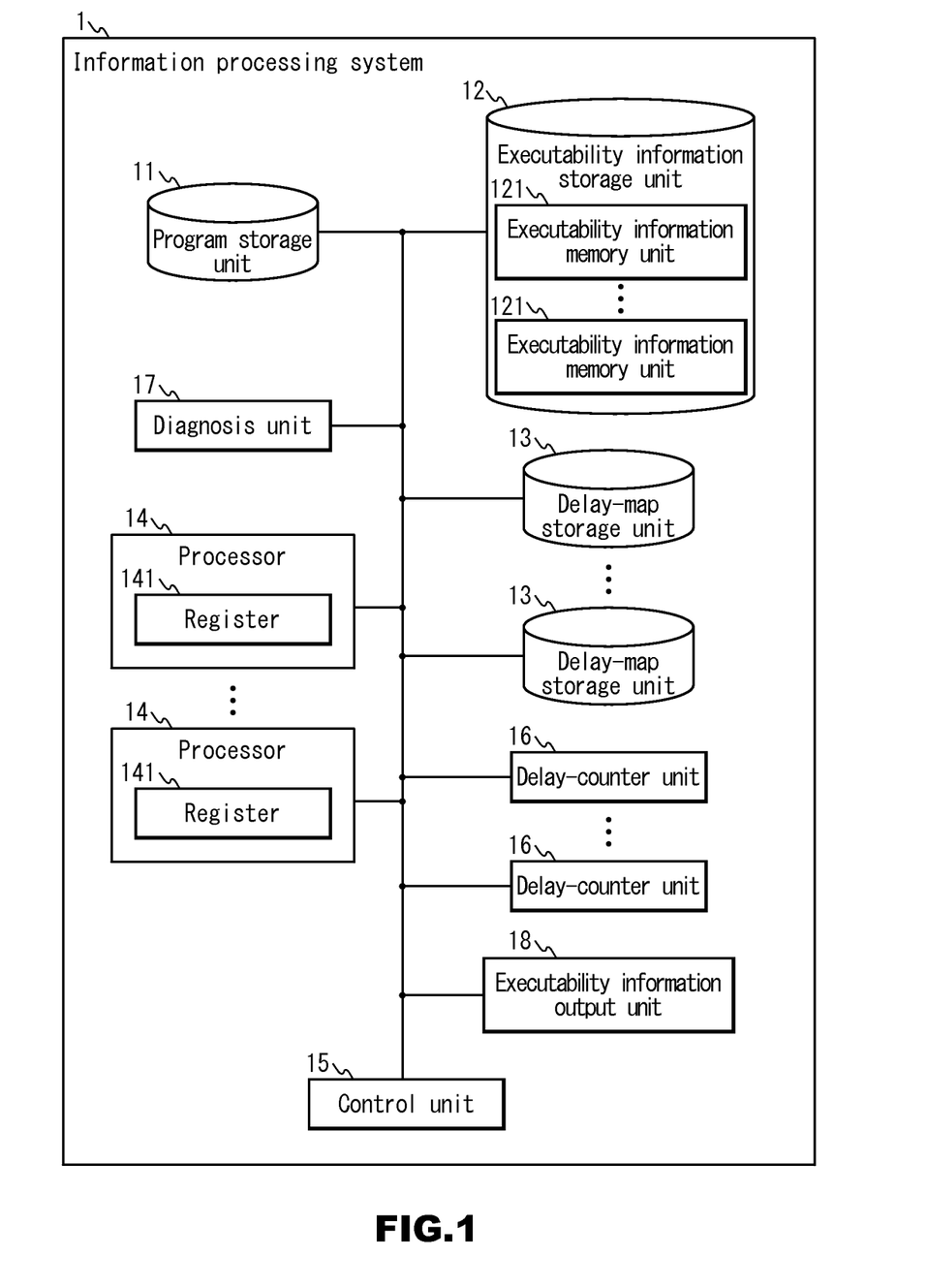
FIG. 1 is a block diagram of an information processing system 1 in an embodiment.

FIG. 1 is a block diagram of an information processing system 1 in this embodiment. The information processing system 1 includes a program storage unit 11, an executability information storage unit 12, one or at least two delay-map storage units 13, two or more processors 14, a control unit 15, one or at least two delay-counter units 16, a diagnosis unit 17, and an executability information output unit 18.

Furthermore, the executability information storage unit 12 includes one or at least two executability information memory units 121. The executability information storage unit 12 may include the executability information memory units 121 respectively for the processors 14, or may include one executability information memory unit 121 for the multiple processors 14, for example. Moreover, for example, registers 141 are respectively provided for the processors 14, or one register 141 may be provided for the multiple processors 14.

In the program storage unit 11, a program that is to be executed can be stored. Furthermore, in the program storage unit 11, an interrupt handling routine, software forming the control unit 15 (described later), software forming the diagnosis unit 17 (described later), and the like can be stored. Note that a program that is to be executed refers to, for example, an application program, but may refer to basic software such as an OS.

The program storage unit 11 is preferably a non-volatile storage medium such as a ROM, but may be realized also as a volatile storage medium such as a RAM.

There is no limitation on the procedure in which a program that is to be executed and the like are stored in the program storage unit 11. For example, the program and the like may be stored in the program storage unit 11 via a storage medium, the program and the like transmitted via a communication line or the like may be stored in the program storage unit 11, or the program and the like input via an input device may be stored in the program storage unit 11.

In the executability information storage unit 12, two or more pieces of executability information can be stored. In the executability information storage unit 12, typically, two or more pieces of executability information respectively corresponding to the two or more processors are stored. The executability information includes information specifying instructions as being executable or not executable by the processors 14. That is to say, the executability information is, for example, a set of instruction identifiers for non-executable instructions. Here, the executability information also may be a set of instruction identifiers for executable instructions, etc. Furthermore, the executability information may be, for example, a set of instruction identifiers for non-executable instructions and instruction identifiers for executable instructions, etc. More specifically, the executability information is, for example, a group of opcodes of executable instructions or opcodes of non-executable instructions. Note that an instruction typically has an opcode and an operand. For example, "LDA" of an instruction "LDA #$AB" corresponds to an opcode, and "#$AB" corresponds to an operand.

Furthermore, the executability information may be information specifying instruction-groups as being executable or not executable by the processors 14. In this case, the executability information is, for example, a set of group identifiers for non-executable instruction-groups. Here, the executability information also may be a set of group identifiers for executable instruction-groups, etc. Furthermore, the executability information may be, for example, a set of group identifiers for non-executable groups and group identifiers for executable groups, etc. Note that the instruction-group is a set of one or at least two instructions. Here, at least one instruction-group is a set of two or more instructions. Furthermore, it is preferable that two or more similar instructions belong to one instruction-group.

Here, the instruction is, for example, a machine language instruction. The instruction may be, for example, an assembler instruction, machine code, a macroinstruction, or the like. That is to say, there is no limitation on the type of instruction or the like. For example, on a 6502 processor, the instructions are JMP, JSR, RTS, BNE, LDA, STA, ASL, ROR, ADC, or the like. JMP refers to a jump instruction, JSR refers to an instruction to call a sub-routine, and RTS refers to an instruction to return from a sub-routine. Furthermore, BNE refers to an instruction to perform comparison and jump, LDA and STA refer to instructions regarding writing into a register, ASL and ROR refer to instructions regarding shift, and ADC refers to an instruction to perform arithmetic addition.

The executability information is stored in the executability information storage unit 12, for example, in association with a processor identifier for identifying a processor, or wired directly to each processor.

Furthermore, the executability information contains one bit for each instruction of each corresponding processor. For example, a processor for which the bit corresponding to an instruction that is to be executed is on is activated.

Each of the executability information memory units 121 is a storage medium in which the executability information corresponding to one processor 14 is stored. The executability information memory units 121 are arranged, typically, in association with the processors. Note that the executability information is, typically, information stored by the diagnosis unit 17 (described later).

The executability information storage unit 12 and the executability information memory units 121 are typically realized as non-volatile storage media, but volatile storage media also can be used. The executability information storage unit 12 and the like are, for example, RAMs, EEPROMs such as flash memories, or the like.

In the delay-map storage units 13, instruction length information, which is information regarding an instruction length corresponding to each of the one or more instructions, can be stored. The instruction length information is typically represented as the number of clock cycles, but there is no limitation to this. The instruction length information is managed typically in association with an instruction.

The delay-map storage units 13 are preferably non-volatile storage media, but may be realized also as volatile storage media. There is no limitation on the procedure in which the instruction length information is stored in the delay-map storage units 13. For example, the instruction length information may be stored in the delay-map storage units 13 via a storage medium, the instruction length information transmitted via a communication line or the like may be stored in the delay-map storage units 13, or the instruction length information input via an input device may be stored in the delay-map storage units 13.

Each of the processors 14 can execute one or more instructions. Furthermore, the processor 14 is preferably a CPU, but may be an MPU, a GPU, an FPU, a DSP, a PPU, a processor for peripheral devices, a data communications processor, or the like, that is, the processor 14 can be broadly interpreted. Furthermore, one processor 14 may include multiple processors such as CPUs and GPUs.

Each of the two or more processors 14 includes, for example, one or more registers 141 in which a result of an instruction executed by the processor is held. Here, the two or more processors 14 may share all of the one or more registers. Note that the two or more processors 14 may be the same processor 14, or may be different processors 14.

Furthermore, two or more instructions that are executable by the processors 14 may form two or more instruction-groups. At least one or two instructions belong to one instruction-group.

Furthermore, the two or more processors 14 may be capable of parallel execution.

In the registers 141, results of instructions executed by the two or more processors 14 are held. That is to say, results of processing performed by the processors 14 are written by the processors 14 into the registers 141.

At the time of execution of the program, the control unit 15 selects at least one processor 14 for execution of one or more instructions necessary to execute the program, from among the two or more processors 14, with reference to the executability information stored in the executability information storage unit 12, and causes the selected at least one processor 14 to execute the instructions.

At the time of execution of the program, the control unit 15 selects a processor 14 that can execute one instruction that is to be executed, or an instruction in one instruction-group that is to be executed, with reference to the executability information stored in the executability information storage unit 12, and causes the selected processor 14 to execute the instruction.

In order to select a processor 14 for execution of one instruction, the control unit 15 refers to the executability information corresponding to a processor 14 that has executed an instruction immediately before said one instruction, selects this processor 14 as the processor 14 for execution of said one instruction if the processor 14 can execute said one instruction, and causes the selected processor 14 to execute the instruction.

Note that, based on the diagnosis result from the diagnosis unit 17 described below, the control unit 15 may activate only one processor 14 that is to execute an instruction. In this case, the activated processor 14 executes the instruction. Furthermore, it is assumed that, if one processor 14 is activated based on the diagnosis result from the diagnosis unit 17, the activation processing is performed by the control unit 15. Note that this processing may be performed by the diagnosis unit 17.

The delay-counter units 16 acquire the instruction length information corresponding to the instruction that the control unit 15 causes the processor 14 to execute, and wait for the duration corresponding to the instruction length information. Furthermore, the delay-counter units 16 may acquire the instruction length information corresponding to the instruction that the control unit 15 causes the processor 14 to execute, from the delay-map storage unit 13 corresponding to the processor 14 that the control unit 15 causes to execute the instruction, and wait for the duration corresponding to the instruction length information. Note that the delay-counter units 16 may be realized as delay-counters.

The diagnosis unit 17 checks whether or not instructions are executable by each of the two or more processors, thereby acquiring the executability information for each of the processors 14, and stores the executability information in the executability information storage unit 12. Furthermore, the diagnosis unit 17 may check whether or not instruction-groups are completely executable by each of the two or more processors, thereby acquiring the executability information for each of the processors 14, and store the executability information in the executability information storage unit 12. Here, "store" is realized, for example, as outputting to an output-port, latching, flashing, burning into the EEPROM, or the like.

The diagnosis unit 17 continuously functions, for example, with an interrupt routine. Here, "continuously" typically refers to "regularly", but may refer to "irregularly". Furthermore, "regularly" typically refers to "at equal intervals". The diagnosis unit 17 performs the complete or partial operation, for example, 10 times per second.

The executability information output unit 18 outputs the one or more pieces of executability information stored in the executability information storage unit 12. There is no limitation on the timing at which the executability information output unit 18 outputs the executability information. The executability information output unit 18 may output the executability information, in response to output instructions accepted by an unshown unit, or at timings determined by the executability information output unit 18. Here, "output" refers to, for example, outputting to a display device. Furthermore, the executability information output unit 18 may be considered to include or not to include an output device such as a display screen. The executability information output unit 18 may be realized as driver software for an output device, or a combination of driver software for an output device, the output device, and the like.

Next, the operation of the information processing system 1 will be described with reference to the flowchart in FIG. 2.

(Step S201) The control unit 15 reads a program that is to be executed, from the program storage unit 11. Note that a program is executed by executing multiple instructions.

(Step S202) The control unit 15 substitutes 1 for a counter i.

(Step S203) The control unit 15 determines whether or not there is an ith instruction in the read program. If there is the ith instruction, the procedure advances to step S204, and, otherwise, the procedure is ended.

(Step S204) The control unit 15 acquires the ith instruction.

(Step S205) The control unit 15 substitutes 1 for a counter j.

(Step S206) The control unit 15 determines whether or not there is a jth processor in the information processing system 1. If there is the jth processor, the procedure advances to step S207, and, otherwise, the procedure advances to step S214.

(Step S207) The control unit 15 acquires the executability information corresponding to the jth processor, from the executability information storage unit 12. Here, the control unit 15 preferably acquires only the executability information corresponding to the jth processor regarding the ith instruction.

(Step S208) The control unit 15 determines whether or not the ith instruction is executable by the jth processor, using the executability information acquired in step S207. If the ith instruction is executable by the jth processor, the procedure advances to step S209, and, otherwise, the procedure advances to step S213.

(Step S209) The control unit 15 gives the jth processor an instruction to execute the ith instruction. Thus, the jth processor executes the ith instruction, and writes the execution result into the register 141. The register 141 is preferably a register 141 corresponding to the jth processor, but also may be a register 141 shared between the multiple processors 14.

(Step S210) The delay-counter unit 16 acquires the instruction length information corresponding to the ith instruction that is being executed by the jth processor, from the delay-map storage unit 13. Note that the instruction length information corresponding to the ith instruction may be different from processor to processor, or may be the same.

(Step S211) The delay-counter unit 16 waits for the duration corresponding to the instruction length information acquired in step S210. More specifically, for example, it waits for the amount of clockcycles that are necessary to complete a full instruction.

(Step S212) The control unit 15 increments the counter i by 1. The procedure returns to step S203.

(Step S213) The control unit 15 increments the counter j by 1. The procedure returns to step S206.

(Step S214) The control unit 15 outputs an error message. The procedure is ended.

Figure 2:
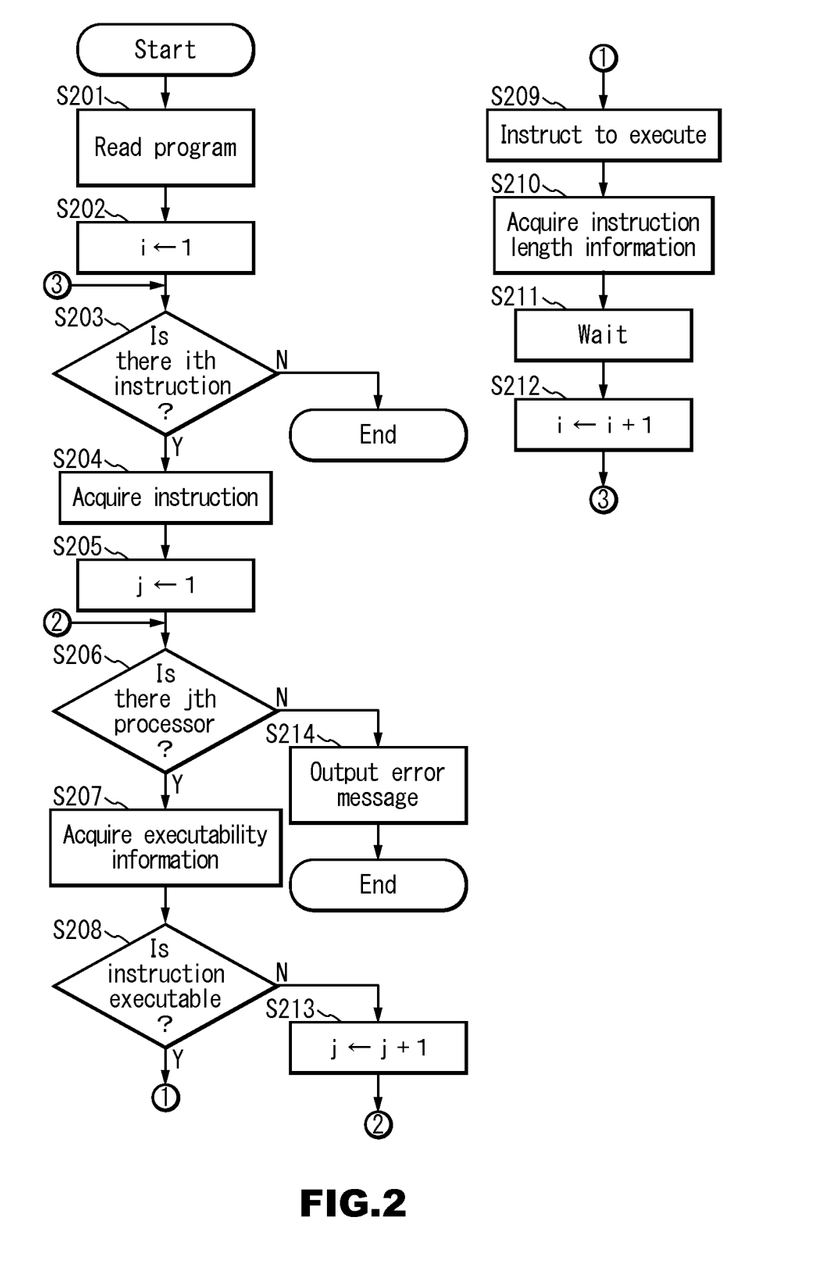
FIG. 2 is a flowchart illustrating the operation of the information processing system 1.

Although not shown in the flowchart in FIG. 2, it is preferable that the diagnosis unit 17 checks continuously, for example, with an interrupt routine, whether or not instructions are executable by each of the two or more processors, thereby acquiring the executability information for each of the processors 14, and stores the executability information in the executability information storage unit 12.

Furthermore, a processor that has executed the previous instruction ((i−1)th instruction) is preferably taken as the first processor in S206 of the flowchart in FIG. 2. That is to say, instructions are preferably executed without changing the current processor to the extent possible, by taking a processor that has executed an instruction as the current processor.

Furthermore, in the flowchart in FIG. 2, the executability information output unit 18 preferably outputs the one or more pieces of executability information stored in the executability information storage unit 12.

Furthermore, in the flowchart in FIG. 2, there is the counter i. However, for example, if the information processing system 1 reads one instruction at a time and processes the read one instruction, the counter i is not necessary.

Furthermore, in the flowchart in FIG. 2, there is the counter j. However, if the information processing system 1 is configured to activate only one processor 14 that can execute an instruction, the counter j is not necessary.

Furthermore, in the flowchart in FIG. 2, the procedure is ended if there is no ith instruction in step S203. However, the information processing system 1 does not have to end the procedure. That is to say, for example, the information processing system 1 may wait until a next instruction is received.

Hereinafter, a specific configuration, operation, and the like of the information processing system 1 in this embodiment will be described.

The information processing system 1 aims to increase the availability and hardware-fault tolerance of a computer-system using multiple CPU cores. Usually, complete CPUs are disabled in case of hardware failure. If many failures happen, there is no CPU left to run the system, which is a problem. The information processing system 1 is different from the conventional system in this problem. That is to say, the information processing system 1 is configured such that CPUs are sliced into smaller and independent instruction-groups, for example. An instruction-group could be a combination of similar instructions. Furthermore, the information processing system 1 performs data-processing using partially damaged CPUs, while keeping track of the damage in fault-maps. This system is advantageous, for example, in that, if the information processing system 1 has two CPUs, the system can continue the processing even after both CPUs have suffered a partial failure. The remaining undamaged instructions from both CPUs can be enough to continue the execution of programs in full speed.

In this specification, a CPU refers to a type of processor 14. A fault-map refers to an example of executability information.

Hereinafter, two specific examples of the information processing system 1 will be described.

Example 1

Figure 3:
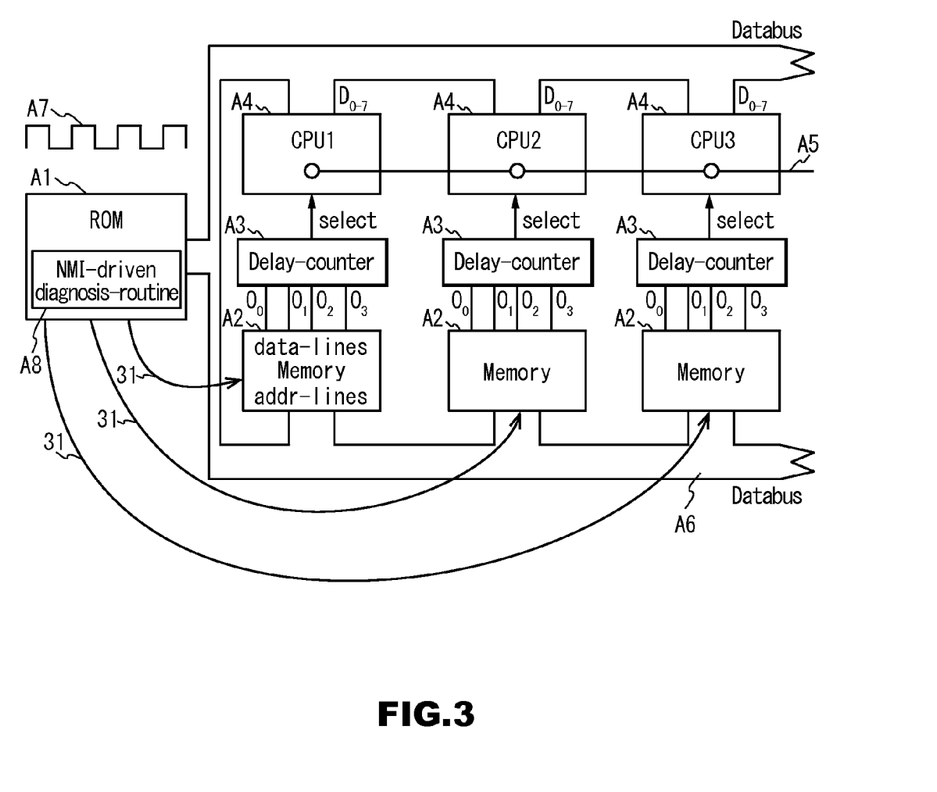
FIG. 3 is a specific configuration diagram of the information processing system 1.

FIG. 3 is a configuration diagram of the information processing system 1 in Example 1. In Example 1, the information processing system 1 includes three processors 14.

In FIG. 3, a ROM (A1) corresponds to the program storage unit 11. Furthermore, the ROM (A1) contains a program for realizing the diagnosis unit 17. Furthermore, the program of the diagnosis unit 17 may be realized by an interrupt routine A8 in FIG. 3.

Furthermore, in FIG. 3, memories (A2) correspond to the executability information storage unit 12 and the delay-map storage units 13. Delay-counters (A3) in FIG. 3 correspond to the delay-counter units 16 in FIG. 1. Furthermore, CPUs (A4) correspond to the processors 14. In FIG. 3, A5 denotes a bus, and is used for sharing information between the registers. In FIG. 3, A6 denotes a databus. Furthermore, A7 denotes an interrupt signal. A8 corresponds to the diagnosis unit 17. Furthermore, the diagnosis-routine corresponds to the diagnosis unit 17. Note that the executability information output unit 18 in FIG. 1 is not shown in FIG. 3. Furthermore, the defect-map corresponds to the executability information.

In order to increase the availability of a computer-system, multiple CPU cores are used on one systembus. In FIG. 3, the ROM (A1) contains the application-software and the interrupt handling routine (A8). A volatile or non-volatile memory (A2) is used to translate each machine-code instructions from the ROM (A1) into enable-signals. The address-lines of the memory are connected to the data-bus of the CPUs. The CPU that receives the enable-signal becomes active, and the other CPUs keep their address-lines and data-lines passive (three-state). Since multiple instructions have various length, the memory (A2) contains the information on the number of clock cycles necessary to execute every instruction on the CPUs (A4) (the above-described instruction length information). The number of clock cycles is used such that every instruction is executed completely on one CPU before another CPU becomes active to continue processing the program. That is to say, the number of clock cycles is transferred from the delay-map in the non-volatile memory (A2) to the delay-counter (A3). The delay-counter (A3) counts down the number of clock cycles to zero while receiving the same system-clock as all CPUs do. The execution results stored in the registers are shared between the CPUs (A4). The execution results can be shared by connecting the CPUs (A4) via the bus (A5). Simply in order to centralize the registers, the registers may be connected. Alternatively, in order to increase reliability, the registers can exist in various places and synchronize register-data (in case of the 6502 they are: accumulator, X-register, Y-register, program-counter, stack pointer, status-register, etc.) at least after every completed machine-instruction. Sharing registers is necessary to ensure that the next machine-code instruction can be executed by any available CPU.

When small damage happens to various parts in the information processing system 1, only functional instruction units will be activated. The diagnosis-routine is executed, for example, 10 times per second by the interrupt system (A7). The interrupt system (A7) runs a quick test to see whether or not one instruction on one CPU is still functional. This will be repeated for every instruction on every CPU-core. For example, if one CPU contains 100 instructions, and three CPUs exist in one system, 300 NMIs are required to verify the functionality of all instructions in all CPU cores. The results of these tests are written after every test into the map-memory (A2) via output-ports or latches addressed by the CPUs. In FIG. 3, arrows 31 symbolize for simplicity these map update write-operations. The I/O-ports are not shown in FIG. 3. And $O_1$~$O_3$ indicate output lines in FIG. 3.

It is possible to obtain detailed information about the kind of damage, by reading the defect-map memories, for example through input-ports. This information is helpful for predicting failures of the complete CPU system. That is to say, the executability information can be used to warn the user. Furthermore, the executability information can be used to optimize the amount of instructions per partial CPU core in system-redesigns. The instructions that are less likely to fail can be omitted in some of the future CPU cores to save space. This saved space in return makes it possible to add more CPU cores in order to further increase reliability.

Example 2

Figure 4:
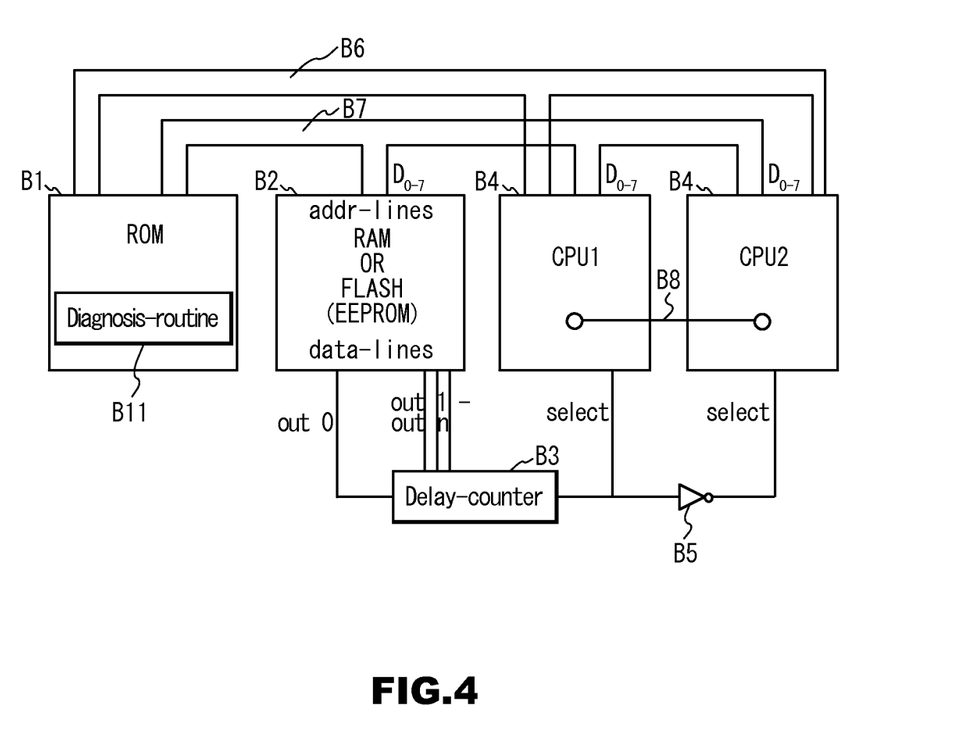
FIG. 4 is a specific configuration diagram of the information processing system 1.

FIG. 4 is a configuration diagram of the information processing system 1 in Example 2. In Example 2, the information processing system 1 includes two processors 14.

In FIG. 4, B1 denotes a ROM, and corresponds to the program storage unit 11 and the diagnosis unit 17. That is to say, programs that are to be executed, software forming the diagnosis unit 17, and the like are stored in the ROM (B1).

Furthermore, B2 denotes a RAM or an EEPROM (e.g., a flash memory), and corresponds to the executability information storage unit 12 and the delay-map storage unit 13. That is to say, the executability information and the instruction length information are stored in the RAM or the like (B2).

Furthermore, B3 denotes a delay-counter, and corresponds to the delay-counter unit 16. The delay-counter (B3) waits for a necessary number of clock cycles, using the instruction length information in the RAM or the like (B2).

Furthermore, in this example, B4 denotes a CPU, and corresponds to the processor 14. Moreover, B5 denotes an inverter that has a function of switching CPUs, and corresponds to the control unit 15. Whenever CPU1 is disabled (due to fault), then CPU2 will be enabled.

Furthermore, for example, B6 denotes a 16-bit addressbus, and B7 denotes an 8-bit databus. Moreover, B8 denotes a bus for synchronizing the CPU-execution results stored in the registers of the CPUs.

If only two cores (the processors 14) are used as shown in Example 2, this system can be realized at low cost. In this case, only one map-memory is implemented.

In the information processing system in FIG. 4, if one CPU core (B4) is not able to execute one instruction, a diagnosis-routine (B11) toggles the corresponding defect-flag (the executability information) in the map-memory (in B2), thereby rewriting the information to the effect that this one CPU core is not able to execute the one instruction or an instruction-group containing the one instruction. At the same time, the inverter (B5) is used to activate the one instruction or an instruction-group containing the one instruction on the other CPU-core.

If the same instructions or instruction-groups are damaged on both CPU cores, the system has become useless and no recovery is possible.

In this case, in order to improve the efficiency of this design, this single instruction is set as a group independent from other instructions. With this design, even if physical damage (open, short) happens, and one instruction fails, execution of other instructions is less affected.

Figure 5:
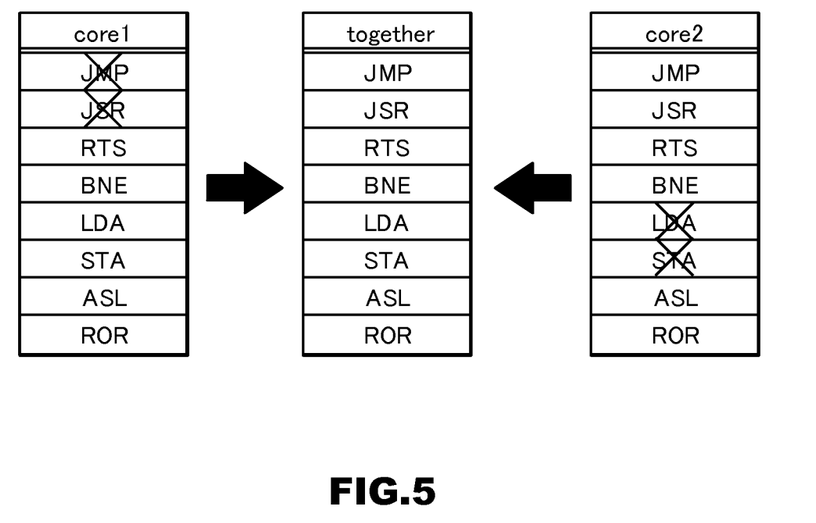
FIG. 5 is a diagram illustrating the operation of the information processing system 1.

For example, in the information processing system 1 in FIG. 4, the executability information, indicating that the core 1 of the two CPU cores (the core 1 and the core 2) is not able to execute "JMP" and "JSR" instructions and that the core 2 is not able to execute "LDA" and "STA" instructions, is stored in the RAM or the like (B2) (see FIG. 5).

In this case, as shown in FIG. 5, the information processing system 1 can execute all instructions using the core 1 or the core 2. That is to say, for example, the core 2 is used to execute "JMP" instruction, and the core 1 is used to execute "LDA" instruction.

As described above, according to this embodiment, it may be possible to continue execution of programs even if all processors have suffered a partial failure.

Figure 6:
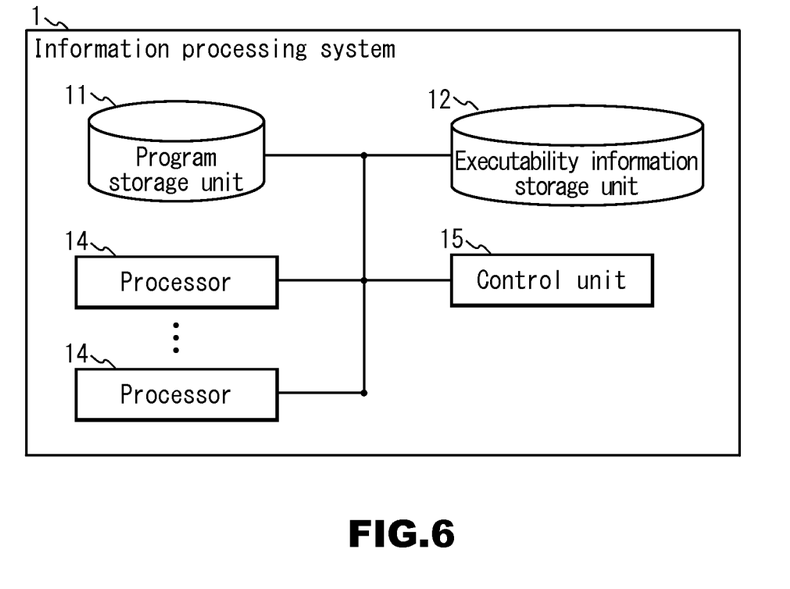
FIG. 6 is another block diagram of the information processing system 1.

Note that, in this embodiment, the information processing system 1 may include only the program storage unit 11, the executability information storage unit 12, the two or more processors 14, and the control unit 15. In this case, the information processing system 1 may be configured such that, when one processor is executing an instruction, another processor waits for a sufficient number of clock cycles. Furthermore, in this case, the executability information is given from the outside. FIG. 6 shows a block diagram of the information processing system 1 in this case.

It will be appreciated that the present invention is not limited to the embodiment set forth herein, and various modifications are possible within the scope of the present invention.

As described above, the information processing system according to the present invention is effective in that it is possible to continue execution of programs even if processors have suffered a partial failure, and, thus, this system is useful as an information processing system and the like.

The invention claimed is:

1. An information processing system, comprising:
   a program storage unit in which a program that is to be executed is stored;
   at least two processors, each of which executes at least one instruction;
   an executability information storage unit in which executability information, which includes information specifying, for each instruction of a plurality of instructions necessary to execute the program, whether the respective instruction is executable or not executable by each of the at least two processors, is stored for each of the at least two processors; and
   a control unit that, at the time of execution of the program, selects at least one processor from among the at least two processors for execution of at least one instruction of the plurality of instructions necessary to execute the program, with reference to the executability information stored in the executability information storage unit, and causes the selected at least one processor to execute the at least one instruction.

2. The information processing system according to claim 1, further comprising:
   a diagnosis unit that checks whether or not each instruction is executable by each of the at least two processors, thereby acquiring the executability information for each of the at least two processors, and stores the executability information in the executability information storage unit.

3. The information processing system according to claim 1, wherein
   the at least two processors respectively include registers in which results of instructions executed by the at least two processors are held, and
   the execution results stored in the at least two registers of the at least two processors are shared between the at least two processors.

4. The information processing system according to claim 1, further comprising:
   a delay-map storage unit in which instruction length information, which is information regarding an instruction length corresponding to the at least one instruction, is stored; and
   a delay-counter unit that acquires instruction length information corresponding to the at least one instruction that the control unit causes the selected at least one processor to execute, and waits for a duration corresponding to the instruction length information.

5. The information processing system according to claim 4, wherein
   the delay-map storage unit and the delay-counter unit are arranged in association with each of the at least two processors, and
   the delay-counter unit acquires instruction length information corresponding to the at least one instruction that the control unit causes the selected at least one processor to execute, from the delay-map storage unit corresponding to the selected at least one processor that the control unit causes to execute the at least one instruction, and waits for a duration corresponding to the instruction length information.

6. The information processing system according to claim 1, wherein
   the executability information includes information indicating, for each instruction-group containing one or at least two instructions, whether or not the instructions contained in the instruction-group are executable.

7. The information processing system according to claim 1, wherein
   the executability information storage unit includes at least two executability information memory units, each of which is a storage medium in which executability information corresponding to one processor is stored.

8. The information processing system according to claim 1, wherein
   the executability information storage unit is one storage medium in which at least two pieces of executability information respectively corresponding to the at least two processors are stored.

9. The information processing system according to claim 1, further comprising:
   an executability information output unit that outputs at least one piece of the executability information stored in the executability information storage unit.

10. The information processing system according to claim 1, wherein,
    in order to select a processor for execution of one instruction, the control unit refers to the executability information corresponding to a processor that has executed an instruction immediately before the one instruction, selects the processor as the processor for execution of the one instruction in a case where the processor can execute the one instruction, and causes the selected processor to execute the instruction.

11. An information processing method, using a storage medium in which a program that is to be executed is stored, and in which executability information, which includes information specifying, for each instruction of a plurality of instructions necessary to execute the program, whether the respective instruction is executable or not executable by each of at least two processors, is stored for each of the at least two processors, and being implemented by a control unit,     the method comprising a control step of, at the time of execution of the program, selecting by the control unit at least one processor from the at least two processors for execution of at least one instruction of the plurality of instructions necessary to execute the program, with reference to the executability information, and causing by the control unit the selected at least one processor to execute the at least one instruction.

* * * * *